(12) United States Patent
Zafiroglu et al.

(10) Patent No.: US 7,588,818 B2
(45) Date of Patent: Sep. 15, 2009

(54) HIGH BULK COMPOSITE SHEETS

(75) Inventors: Dimitri P. Zafiroglu, Wilmington, DE (US); Jeffrey Allen Chambers, Hockessin, DE (US); Geoffrey David Hietpas, Newark, DE (US)

(73) Assignee: INVISTA North America S.a r.l., Wilmington, DE (US)

( * ) Notice: Subject to any disclaimer, the term of this patent is extended or adjusted under 35 U.S.C. 154(b) by 247 days.

(21) Appl. No.: 11/228,128

(22) Filed: Sep. 16, 2005

(65) Prior Publication Data

US 2006/0068176 A1 Mar. 30, 2006

Related U.S. Application Data

(62) Division of application No. 10/320,086, filed on Dec. 16, 2002, now Pat. No. 7,201,816.

(51) Int. Cl.
*B32B 7/02* (2006.01)
*B32B 27/32* (2006.01)
*B32B 5/12* (2006.01)

(52) U.S. Cl. ............... 428/212; 428/220; 428/152; 428/198; 428/295.7; 428/297.1; 428/297.4

(58) Field of Classification Search ................. 428/212, 428/220, 152, 198, 295.7, 297.1, 297.4
See application file for complete search history.

(56) References Cited

U.S. PATENT DOCUMENTS

| | | | |
|---|---|---|---|
| 3,595,731 A | 7/1971 | Davies et al. | |
| 3,671,379 A | 6/1972 | Evans et al. | |
| 3,755,082 A | 8/1973 | Schirmer | |
| 4,446,189 A | 5/1984 | Romanek | |
| 4,720,415 A * | 1/1988 | Vander Wielen et al. | .... 428/152 |
| 5,382,400 A | 1/1995 | Pike et al. | |
| 5,418,045 A | 5/1995 | Pike et al. | |

FOREIGN PATENT DOCUMENTS

| | | | |
|---|---|---|---|
| EP | 1 138 473 A | * | 2/2001 |
| JP | 07 040494 A | | 2/1995 |
| WO | WO 97/02130 A1 | | 1/1997 |
| WO | WO 97/29027 A1 | | 8/1997 |

\* cited by examiner

*Primary Examiner*—David R Sample
*Assistant Examiner*—Lawrence D Ferguson
(74) *Attorney, Agent, or Firm*—Christina W. Geerlof

(57) ABSTRACT

A multi-layer composite sheet comprising a shrinkable layer intermittently bonded a to a gatherable layer with the bonds separated by a specified distance and wherein the shrinkable layer can shrink and at the same time gather the gatherable layer between the bonds. A process for preparing multi-layer composite sheets by intermittently bonding a shrinkable layer to a gatherable layer with the bonds separated by a specified distance and causing the shrinkable layer to shrink while at the same time gathering the gatherable layer between the bonds. Preferably, the shrinkable layer comprises an array of fibers or nonwoven web comprising fibers having latent spiral crimp.

20 Claims, 3 Drawing Sheets

HIGH BULK COMPOSITE SHEETS

CONTINUITY DATA

This application is a divisional of U.S. patent application Ser. No. 10/320,086, filed Dec. 16, 2002, now U.S. Pat. No. 7,201,816.

BACKGROUND OF THE INVENTION

1. Field of the Invention

This invention relates to an improved method for preparing resilient multi-layer composite sheets having very high bulk by intermittently bonding a shrinkable layer to a gatherable layer.

2. Description of Related Art

Nonwoven sheets with high bulk are known. Resilient versions, intended for cushion and insulation end uses, utilizing highly-crimped resilient fibers that are carded or air-laid, are generally known as "fiberfill". Bulk, cushion, and resilience originate from the crimp and the elastic modulus of the fibers. Some fiberfill structures are air-laid with random fiber orientation. Others are carded and cross-lapped to provide balanced properties. Many are lightly needlepunched to improve strength. Most rely on inter-fiber bonding at the fiber cross-over points to prevent disintegration from repeated loading and unloading. Inter-fiber bonding is achieved with spray binders, powder binders, or by intermixing low-melting fibers with higher melting matrix fibers. In some cases it is achieved by using multiple-component fibers comprising a low melting component and a high melting component, such as sheath-core fibers wherein the sheath comprises a polymer having a lower melting point than the core polymer. Such bonded prior art products have limited conformability and drape because of the extensive fiber inter-bonding that is required to stabilize the structures. The level of bulk achieved with prior art products is generally limited unless the product is not entangled or bonded. Such unbonded products, however, are not durable, because they tend to collapse (matdown) under loading.

Improved cushion/insulation products utilizing spirally-crimpable side-by-side multiple-component filaments are also known in the art. These products usually have a basis weight well in excess of 4 oz/yd$^2$, with the fibers inter-bonded at their cross-over points. For example, U.S. Pat. No. 3,595,731 to Davies et al. (Davies) describes side-by-side bicomponent fibrous materials containing bicomponent spirally crimped fibers which are bonded mechanically by the interlocking of the spirals of the crimped fibers and by melting the lower-melting fiber component, to achieve inter-fiber bonding at the crossover points. Crimp can be developed and the potentially adhesive component activated in a single step, or the crimp can be developed first, followed by activation of the adhesive component. Crimp is developed without applying pressure to the sheet, to allow the fibers to develop their full crimp-potential. Such products have high bulk, but do not have the extremely high bulk required in end uses such as pillows and the like, or the drapeability required in end uses such as apparel linings, because, as in products formed from planarly crimped fibers, the degree of bulk generated by fiber crimp alone is not sufficient for such end uses.

U.S. Pat. No. 5,382,400 to Pike et al. (Pike) describes a process for making a nonwoven fabric, which includes the steps of melt-spinning continuous multiple-component polymeric filaments, drawing the filaments, at least partially quenching the multiple-component filaments so that the filaments have latent helical (spiral) crimp, activating the latent helical crimp, and thereafter forming the crimped continuous multiple-component filaments into a nonwoven fabric. The resulting nonwoven fabric is described as being substantially stable and uniform and may have "high loft", again all bulk or "loft" originating entirely from the fiber crimp.

U.S. Pat. No. 3,671,379 to Evans et al. (Evans) describes self-crimpable composite filaments which comprise a laterally eccentric assembly of at least two synthetic polyesters, the first of said two polyesters being partly crystalline, in which the chemical repeat-units of its crystalline region are in a non-extended stable conformation and the second of said two polyesters being partly crystalline in which the chemical repeat-units of the crystalline region are in a conformation more closely approaching the length of the conformation of its fully extended chemical repeat-units. The composite filaments are capable of developing a high degree of helical crimp against the restraint imposed by high thread count woven structures, which crimp potential is unusually well retained despite application of elongating stress and high temperature. The composite filaments increase, rather than decrease, in crimp potential when annealed under tension as a part of the fiber production process. The filaments are described as being useful in knitted, woven, and nonwoven fabrics, and may also be useful in forming bulky/resilient structures. High frequency crimp generation is described, and reference is made to high bulk, without quantification, all of the bulk being generated from fiber crimp.

Bulky elastic composite nonwoven materials are also known in the art. Examples of such materials include "stretch-bonded" and "neck-bonded" laminates. Stretch-bonded laminates are prepared by joining a gatherable layer to an elastic layer while the elastic layer is in an extended condition so that upon relaxing the layers, the gatherable layer is gathered. "Neck-bonded laminates" are produced by joining a necked, non-elastic layer with an elastic layer when the non-elastic layer is in an extended condition. The elastic layer in these products generally comprises an elastic film or an elastic nonwoven web such as an elastic meltblown web.

There remains a need for highly bulky, resilient and durable fibrous sheets that do not rely on extensive inter-fiber bonding or extensive inter-fiber entanglement to produce stable structures, that can withstand repeated loading and unloading without collapsing, and do not rely purely on the development of very high fiber crimp to produce resilient bulk.

BRIEF SUMMARY OF THE INVENTION

This invention is directed to a method for forming a multi-layer composite sheet comprising the steps of:

intermittently bonding at least one gatherable layer to a shrinkable layer with an array of bonds in which adjacent bonds are separated by a distance of at least 5 mm in at least one direction; and causing the bonded multi-layer sheet to shrink in the at least one direction by at least 10% so that the gatherable layer forms buckled sections between adjacent bonds, the buckled multi-layer composite sheet having a thickness of at least 3 mm and a bulk of at least 50 cc/g.

The invention is also directed to a multi-layer composite sheet comprising: a first polymeric layer;

a second polymeric layer bonded to a first side of the first layer with an intermittent pattern of bonds, the bonds being separated by a bond distance of between about 5 and 25 mm in at least one direction, and the second layer being gathered between the bonds and wherein the multilayer composite sheet having a thickness between about 3 mm and 30 mm and a bulk of at least 50 cc/g.

DETAILED DESCRIPTION OF THE INVENTION

Figure 1A:
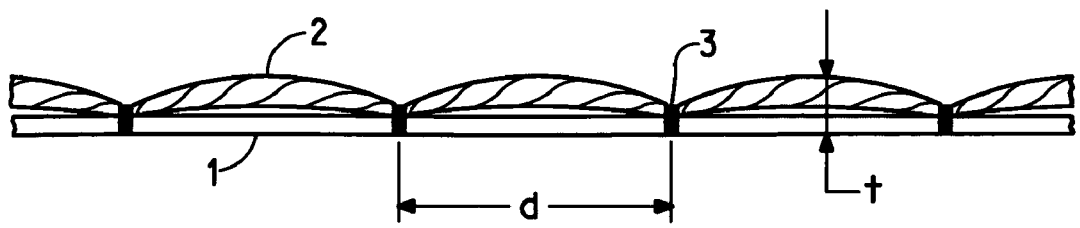
FIG. 1a is a schematic cross-sectional diagram of a two-layer composite sheet prior to shrinking.

The multi-layer composite sheets of the current invention are prepared by intermittently bonding a shrinkable polymeric layer to at least one gatherable layer followed by causing the shrinkable layer to shrink, thus causing the gatherable layer(s) to buckle out-of-plane between the bonds. The shrinkable layer is preferably capable of shrinking in at least one direction by at least 10%, more preferably by at least 20%, and most preferably by at least 40%. The gatherable layer(s) either does not shrink, or preferably shrinks by less than 40%, more preferably less than 20%, most preferably less than 10% of the shrinkage of the highly-shrinkable polymeric layer when the shrinkable layer is caused to shrink. The layers are bonded with a discrete pattern or array of points or lines, with the bond distance between adjacent bonds being at least 5 mm in at least one direction in which the shrinkable polymeric layer shrinks by at least 10%, to maximize the degree of buckling of the gatherable layer(s) between the bonds. The bond distance is measured as the distance between the outside edges of adjacent bonds. During the shrinking step, the shrinkable layer preferably shrinks substantially within the plane of the shrinkable layer. Shrinkage of the shrinkable layer causes the gatherable layer to buckle between the bonds, forming a structure of arches firmly attached to the shrunk layer. In a preferred embodiment, the gatherable layer comprises a nonwoven web, and the shrinkable layer(s) are low-density fibrous warps, nonwoven webs, or nonwoven fabrics. The final overall density of the composite is low, preferably less than about 0.020 g/cc, and the bulk is very high, greater than about 50 cc/g, preferably greater than about 100 cc/g, even after being compressed and released. Multi-layer composite sheets prepared according to the current invention are resilient and durable despite their extremely high bulk and extremely low density.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof. Examples of polyesters include poly(ethylene terephthalate) which is a condensation product of ethylene glycol and terephthalic acid and poly(trimethylene terephthalate) which is a condensation product of 1,3-propanediol and terephthalic acid.

The terms "nonwoven fabric", "nonwoven web", and "nonwoven layer" as used herein mean a textile structure of individual fibers, filaments, or threads that are directionally or randomly oriented and optionally bonded by friction, and/or cohesion and/or adhesion, as opposed to a regular pattern of mechanically inter-engaged fibers, i.e. it is not a woven or knitted fabric. Examples of nonwoven fabrics and webs include spunbond continuous filament webs, carded webs, air-laid webs, and wet-laid webs. Suitable bonding methods include thermal bonding, chemical or solvent bonding, resin bonding, mechanical needling, hydraulic needling, stitch-bonding, etc.

The term "multi-layer composite sheet" is used herein to refer to a multi-layer construction comprising at least two layers of material wherein at least one of said layers comprises a sheet structure such as a film, fabric, or web. For example, the multi-layer composite sheet may include at least one layer of knit, woven, or nonwoven fabric. Other layers suitable for preparing the multi-layer composite sheets include arrays or warps of filaments, such as an array or warp of spirally-crimpable filaments, films, plastic nettings, and the like.

The term "machine direction" (MD) is used herein to refer to the direction in which a nonwoven web is produced. The term "cross direction" (XD) refers to the direction generally perpendicular to the machine direction.

The terms "multiple-component filament" and "multiple-component fiber" as used herein refer to any filament or fiber that is composed of at least two distinct polymers which have been spun together to form a single filament or fiber. As used herein the term "fiber" includes both continuous filaments and discontinuous (staple) fibers. Nonwoven layers used to form the multi-layer composite sheets of the current invention may be made from either short (staple) fibers or continuous filaments. By the term "distinct polymers" it is meant that each of the at least two polymeric components are arranged in distinct substantially constantly positioned zones across the cross-section of the multiple-component fibers and extend substantially continuously along the length of the fibers. The polymeric components in multiple-component fibers may be chemically different or they may have the same chemical composition. If they are chemically the same, they should differ in isomeric form, crystallinity, shrinkage, elasticity or other property to provide spirally-crimpable fibers. Multiple-component fibers are distinguished from fibers that are extruded from a homogeneous melt blend of polymeric materials in which zones of distinct polymers are not formed. One or more of the polymeric components in the multiple-component fiber can be a blend of different polymers. Multiple-component fibers that are capable of developing spiral crimp have a laterally eccentric cross-section, that is, the polymeric components are arranged in an eccentric relationship in the cross-section of the fiber. Preferably, the multiple-component fiber is a bicomponent fiber which is made of two distinct polymers and having an eccentric sheath-core or a side-by-side arrangement of the polymers. Most preferably, the multiple-component fiber is a side-by-side bicomponent fiber. If the bicomponent fiber has an eccentric sheath-core configuration, the lower melting polymer is preferably in the sheath to facilitate thermal point bonding of the nonwoven layers prior to heat treatment.

The term "multiple-component web" as used herein refers to a nonwoven web comprising multiple-component fibers.

The term "bicomponent web" as used herein refers to a nonwoven web comprising bicomponent fibers. The multiple-component and bicomponent webs can comprise blends of multiple-component fibers or bicomponent webs, respectively, with single component fibers.

The term "spunbond" fibers as used herein means fibers which are formed by extruding molten thermoplastic polymer material as fibers from a plurality of fine, usually circular, capillaries of a spinneret with the diameter of the extruded filaments then being rapidly reduced by drawing and quenched. Other fiber cross-sectional shapes such as oval, multi-lobal, etc. can also be used. Spunbond fibers are generally continuous filaments and have an average diameter of greater than about 5 micrometers. Spunbond nonwoven fabrics or webs are formed by laying spunbond fibers randomly on a collecting surface such as a foraminous screen or belt using methods known in the art. Spunbond webs may be bonded using methods known in the art such as by thermally point bonding the web at a plurality of discrete thermal bond points, lines, etc. located across the surface of the spunbond fabric.

The term "substantially nonbonded nonwoven web" is used herein to describe nonwoven webs in which there is little or no inter-fiber bonding. In some instances, it may be desirable to pre-consolidate one or more nonwoven layers prior to assembling the layers to form the multi-layer composite sheet. Pre-consolidation improves web cohesiveness and handleability and keeps the fibers in each individual web separated from the fibers of the adjacent webs. Pre-consolidation of the web can be achieved using very light calendering or by passing the fabric through a nip of lightly patterned rolls.

As used herein, the term "elastic combination yarn" refers to a yarn which has a first component of elastic filaments that are combined with a second component of non-elastomeric (i.e., "hard") textile fibers or filaments. The elastic filament content of the combination yarn can vary over a wide range. The elastic filament content can amount to as much as 60% of the total weight of the combination yarn. More typically, the elastic filament content is in the range of 2 to 20% of the total weight of the yarn and a content of 3 to 8% generally is preferred for reasons of cost. The combination yarn is usually a bulky yarn that is capable of considerable elastic stretch and recovery. Typical elastic combination yarns for use in the present invention have a recoverable elongation in the range of 50% to 250%, or even higher. Elastic filaments useful as the first component of the combination yarns include those of spandex, elastomers, rubber or the like. Spandex is preferred. As used herein, the term "spandex" has its conventional meaning; namely, a manufactured fiber or filament in which the fiber-forming substance is a long chain synthetic polymer comprised of at least 85% of a segmented polyurethane. Among the yarns included in the term "combination yarns" are yarns of elastic filaments combined with yarns of staple textile fibers or yarns of textile filaments. The yarns can be combined by known techniques such as air-jet entangling, air-jet intermingling, covering, plying, and the like.

Shrinkable layers that can be used to prepare the multi-layer composite sheets of the current invention include warps of partially-oriented filament yarns (POY) and woven, knit, or nonwoven fabrics prepared using these yarns. As used herein, the terms "POY" and "partially oriented yarn" refer to a yarn of partially molecularly oriented polymeric fiber. A fiber of partially molecularly oriented polymer means a fiber of synthetic organic crystalline polymer that has substantial molecular orientation, but which still can achieve further molecular orientation. Partially oriented yarns typically have a break elongation in the range of 50 to 150%. By comparison, "undrawn fiber" (i.e., fiber that is melt-spun at low speed and is not drawn) has a very small amount of molecular orientation and a break elongation of greater than 150%, typically greater than 200%. Conventional fibers of synthetic organic crystalline polymer, such as fibers of polyester or polyamide, are typically fully drawn and generally have break elongations in the range of 15 to 35%. Typical synthetic organic polymers suitable for preparing the fiber of the POY include 66-nylon, 6-nylon, poly(ethylene terephthalate), poly (1,4-butylene terephthalate), cationic dyeable polyester, and the like. POY fiber is usually made by a high-speed melt-spinning operation and typically is used as a feed yarn for making draw-twist textured yarns. Partially oriented yarns typically have the capability of significant shrinkage when subjected, without restraint, to a low temperature heat treatment. For example, some POY can shrink to less than half its original length when immersed in boiling water. Typical POY fiber can also be heat set, while being held at constant dimensions, at a temperature that is in the range of 120° C. to 190° C. The higher portion of the heat-setting temperature range (e.g., 165° C. to 190° C.) is preferred because the higher temperatures permit shorter exposure times to set the synthetic organic polymeric fibers.

In a preferred embodiment, the shrinkable layer comprises a fabric, web or warp prepared using multiple-component fibers or yarns, for example side-by-side bicomponent fibers or yarns, that shrink by developing spiral crimp upon suitable heat treatment. Elastomeric webs, warps, and films can be similarly used if they are sufficiently heat-shrinkable to provide the desired degree of gathering of the gatherable layer. Multi-layer composite sheets prepared using spirally-crimpable or elastomeric fibers as the shrinkable layer are, in general, also elastic after the shrinking step. Any sheet that is shrinkable including films, cast/stretched nettings and the like can be used as the shrinkable layer.

Warps of elastic fibers may also be used as the shrinkable layer. The warps of elastic fibers are maintained under tension in an extended condition during bonding to the gatherable layer. The elastic fibers may include an adhesive for bonding to the gatherable layer. Alternately, the elastic fibers may comprise elastic combination yarns, which are known in the art. Such known yarns include wrapped yarns, covered yarns, plied yarns, false-twisted yarns, air-jet interlaced yarns, air-jet entangled yarns and the like. When elastic combination yarns are used, the hard polymer strands may comprise thermoplastic polymers that serve to facilitate bonding when thermal bonding methods are used. Alternately, multi-layer composite sheets in which the shrinkable layer comprises an array of elastic combination yarns may be intermittently bonded using mechanical needling or hydraulic needling while the elastic combination yarns are extended under tension. The needling is performed such that needled areas are formed in an intermittent pattern or array over the surface of the multi-layer composite wherein the needled areas overlap the combination yarns and are spaced at least 5 mm apart in the direction of the length of the elastic combination yarns.

The shrinkable layer may be a shrinkable film. Most polymeric films will shrink when heated to a temperature greater than the temperature the film was last exposed to during or after drawing in the film-forming process. Alternately, the shrinkable layer may be an elastic film that is held under tension in an extended condition while it is being intermittently bonded to the gatherable layer.

It is noted that the term "shrinkable layer" as used herein includes layers such as elastic layers which can be maintained under tension in an extended condition and then retract (shrink) once the tensioning force is removed. Preferably, the elastic layer is extended by at least 1.2 times, more preferably by at least 1.5 times its original, untensioned length. An elastic layer may be tensioned and extended in one direction or it may be tensioned and extended in more than one direction during the bonding step. When the shrinkable layer is an elastic layer, it is maintained in a tensioned, extended state during bonding to the gatherable layer. For example, a tensioned, stretched elastic layer may be bonded to a substantially untensioned gatherable layer. The bond points have a bond spacing of at least 5 mm in at least one direction in which the elastic layer is stretched, preferably in a direction in which the elastic layer is stretched by at least 20% in length. The shrinking step in this case comprises releasing the tension on the elastic layer after bonding. Similarly, the shrinkable layer may comprise a layer of tensioned spirally-crimped fibers wherein sufficient tension is applied to the layer to at least partly pull out the crimp in the spirally crimped fibers. Upon removal of the tension after bonding, the spirally-crimped fibers retract in a spring-like manner as the spiral crimp recovers, causing the composite sheet to shrink.

Preferred gatherable layers that are capable of buckling out of plane include carded webs, air-laid webs, cross-lapped webs, lightly pre-needled batts, and the like. The structure may also include a combination of such low-bulk webs including lightweight cover fabrics or lightweight membranes or films, preferably having a basis weight of less than about 1 oz/yd$^2$ (33.9 g/m$^2$). A lightweight fabric or film may be used to cover and protect a bulky open web or batt attached to the shrinkable layer. Bulky pre-bonded or entangled nonwoven sheets may also be attached to the shrinkable layer and buckled/bulked, for example during the shrinking step, to produce resilient structures.

Certain preferred embodiments of the current invention utilize spirally-crimpable side-by-side bicomponent fibers in the shrinkable layer and/or in the gatherable layer. When spirally-crimpable fibers are used in both layers, the spirally-crimpable gatherable layer is chosen such that it shrinks substantially less in the shrinking step than the spirally-crimpable shrinkable layer so as to generate the desired bulk via gathering of the gatherable layer when the bonded multi-layer composite is shrunk. Alternately, the spiral crimp in the gatherable layer can be partially or substantially completely activated prior to bonding the gatherable layer to the shrinkable layer. Laterally eccentric multiple-component fibers comprising two or more synthetic components that differ in their ability to shrink are known in the art. Such fibers may form three-dimensional spiral crimp when the crimp is activated, for example by subjecting the fibers to shrinking conditions in an essentially tensionless state. The crimp level as further described below is directly related to the difference in shrinkage between the polymeric components of the fibers. When the multiple-component fibers are spun in a side-by-side conformation, the crimped fibers that are formed after crimp activation have the higher-shrinkage component on the inside of the spiral helix and the lower-shrinkage component on the outside of the helix. Such crimp is referred to herein as "spiral crimp". As used herein, the term "spiral crimp" and "spirally-crimpable fibers" includes fibers that exhibit, or are capable of developing, regions of random 3-dimensional crimp as well as regions in which the fibers assume a spiral helix configuration. Spirally-crimped fibers are distinguished from mechanically crimped fibers such as stuffer-box crimped fibers which generally have two-dimensional crimp. A variety of thermoplastic polymers may be used to form the components of multiple-component fibers that are capable of developing three-dimensional spiral crimp. Examples of thermoplastic resin combinations suitable for forming spirally-crimpable, multiple-component fibers are crystalline polypropylene/high density polyethylene, crystalline polypropylene/ethylene-vinyl acetate copolymers, polyethylene terephthalate/high density polyethylene, poly(ethylene terephthalate)/poly(trimethylene terephthalate), poly(ethylene terephthalate)/poly(1,4-butylene terephthalate), and nylon 66/nylon 6.

To achieve high levels of three dimensional spiral crimp, the polymeric components of the spirally-crimpable multiple-component fibers are preferably selected according to the teaching in Evans, which is hereby incorporated by reference. The Evans patent describes bicomponent fibers in which the polymeric components are partly crystalline polyesters, the first of which has chemical repeat-units in its crystalline region that are in a non-extended stable conformation that does not exceed 90 percent of the length of the conformation of its fully extended chemical repeat units, and the second of which has chemical repeat-units in its crystalline region which are in a conformation more closely approaching the length of the conformation of its fully extended chemical repeat-units than the first polyester. The term "partly crystalline" as used in defining the filaments of Evans serves to eliminate from the scope of the invention the limiting situation of complete crystallinity where the potential for shrinkage would disappear. The amount of crystallinity, defined by the term "partly crystalline" has a minimum level of only the presence of some crystallinity (i.e. that which is first detectable by X-ray diffraction means) and a maximum level of any amount short of complete crystallinity. Examples of suitable fully extended polyesters are poly(ethylene terephthalate), poly (cyclohexyl 1,4-dimethylene terephthalate), copolymers thereof, and copolymers of ethylene terephthalate and the sodium salt of ethylene sulfoisophthalate. Examples of suitable non-extended polyesters are poly(trimethylene terephthalate), poly(tetramethylene terephthalate), poly(trimethylene dinaphthalate), poly(trimethylene bibenzoate), and copolymers of the above with ethylene sodium sulfoisophthalate, and selected polyester ethers. When ethylene sodium sulfoisophthalate copolymers are used, it is preferably the minor component, i.e. present in amounts of less than 5 mole percent and preferably present in amounts of about 2 mole percent. In an especially preferred embodiment, the two polyesters are poly(ethylene terephthalate) and poly (trimethylene terephthalate). The bicomponent filaments of Evans are capable of developing a high degree of helical crimp when heated under tension, whereas other polymer combinations must generally be heated in a tensionless state in order for the spiral crimp to develop. The bicomponent filaments of Evans have a high degree of spiral crimp, generally acting as springs, having a recoil action whenever a stretching force is applied and released. Other partly crystalline polymers which are suitable for use in the current invention include syndiotactic polypropylene which crystallizes in an extended conformation and isotactic polypropylene which crystallizes in a non-extended, helical conformation.

The multi-layer composite sheets of the current invention are prepared by intermittently bonding one or more shrinkable polymeric layers to one or more gatherable non-shrinkable, or less-shrinkable, lightweight polymeric layers using a highly spaced pattern of bonds, with the spacing between adjacent bonds being at least 5 mm in at least one direction (corresponding to a direction in which the multi-composite layer shrinks by at least 10% in the shrinking step). The spacing between adjacent bonds is preferably in the range of 5 mm to about 25 mm, more preferably between about 10 mm to about 25 mm. After bonding, the shrinkable layer is caused to shrink and the less shrinkable or non-shrinkable layer forms a gathered buckled layer in the final composite sheet.

In a preferred embodiment, the shrinkable layer is bonded to the gatherable layer when each layer is in a substantially tensionless state. The shrinkable layer is then caused to shrink by appropriate treatment, such as by heating. This simplifies manufacture of the multi-layer composite sheets compared to processes in which the shrinkable layer is extended under tension during the bonding step, such as when the shrinkable layer is an extended, tensioned elastic layer.

One or more of the layers in the multi-layer composite sheet of the current invention may be a nonwoven layer. Nonwoven layers suitable for use in the composite sheets of the current invention may be prepared from staple fibers using methods known in the art such as carding, garnetting or by air-laying. Staple webs prepared by carding generally have fibers oriented predominantly in the machine direction, whereas air-laid webs are substantially random or isotropic. The staple fibers preferably have a denier per filament between about 0.5 and 6.0 (0.56 to 6.67 dtex) and a fiber length between about 0.5 inch (1.27 cm) and 4 inches (10.1 cm). In order to be processed in a carding apparatus, the multiple-component staple fibers preferably have an initial helical crimp level characterized by a Crimp Index (CI) no greater than about 45% and preferably in the range of about 8% to 15%. Methods for determining these crimp values are provided below preceding the Examples. Multiple-component fibers used to prepare nonwoven layers suitable for use as the shrinkable layer preferably have an initial spiral crimp level in this range. Alternately, the multiple-component fibers can be mechanically crimped.

Staple fibers suitable for use in the gatherable nonwoven layer include polyester, polyamide, polyolefin and cellulosic fibers. When a staple fiber web is used as the gatherable layer, the staple fibers may be blended with lower-melting thermoplastic binder fibers to facilitate bonding of the composite sheet. The binder fibers may also be activated in the unbonded areas of the multi-layer composite sheet to improve the durability of the fabric. Preferably, the binder fibers are added at levels that do not significantly reduce the drapeability of the final composite sheet.

One or more of the layers in the multi-layer composite sheets of the current invention may include continuous filaments. For example, continuous filament webs may be prepared using methods known in the art such as spunbonding. For example, a shrinkable layer comprising a continuous filament spunbond nonwoven web can be prepared by feeding the two or more polymer components as molten streams from separate extruders to a spinneret comprising one or more rows of multiple-component extrusion orifices. The spinneret orifices and spin pack design are chosen to provide filaments having the desired cross-section and denier per filament. Separate spin packs can be used to provide a mixture of different multiple-component filaments in the web, where different filaments are spun from different spin packs. Alternately, single component filaments can be spun from one or more spin packs to form a spunbond nonwoven web comprising both single component and multiple-component filaments.

Continuous filament multiple-component nonwoven webs suitable for use as the shrinkable layer in the current invention preferably comprise at least 40 weight percent, more preferably at least 60 weight percent, of multiple-component filaments having latent spiral crimp. The fibers in the shrinkable layer may consist of 100% spirally-crimpable multiple-component filaments. Preferably, the spunbond filaments have a denier per filament of between about 0.5 and 10.0 (5.55 to 11.1 dtex). The spunbond multiple-component continuous filaments preferably have an initial helical crimp level characterized by a Crimp Index (CI) no greater than about 60%. The spirally crimped fibers (whether staple or continuous) are characterized by a Crimp Development (CD) value, wherein the quantity (% CD−% CI) is greater than or equal to 15% and more preferably greater than or equal to 25%. When the spirally-crimpable multiple-component filaments are bicomponent filaments, the ratio of the two polymeric components in each filament is preferably between about 10:90 and 90:10 based on volume (for example measured as a ratio of metering pump speeds), more preferably between about 30:70 and 70:30, and most preferably between about 40:60 and 60:40. The temperature for activating the spiral crimp should be no higher than 20° C. below the onset of the melting transition temperature of the polymers as determined by Differential Scanning Calorimetry. This is done to avoid premature inter-fiber bonding. The shrinkable layer may be a substantially nonbonded nonwoven web of spirally-crimpable multiple-component fibers. In a preferred embodiment, the shrinkable layer is a substantially nonbonded spirally-crimpable bicomponent nonwoven web. Any pre-consolidation of the spirally-crimpable nonwoven layer should be low enough that the fibers are able to develop sufficient crimp and shrinkage during the heat treatment step to cause the bonded composite sheet to shrink in at least one direction by at least 10%, preferably by at least 20% and most preferably by at least 40%. A pre-consolidated shrinkable nonwoven layer is considered to be substantially nonbonded if the percent area shrinkage of the heat-treated pre-consolidated spirally-crimpable nonwoven layer is at least 90%, preferably 95%, of the area shrinkage of an identical spirally-crimpable nonwoven layer that has not been pre-consolidated and which is subjected to an identical heat treatment step. Examples of suitable shrinkable multiple-component nonwoven webs include carded webs, cross-laid (lapped) webs, and continuous filament spunbond webs that comprise spirally-crimpable multiple-component fibers.

Tensioned, relaxed (i.e., non-tensioned) or semi-relaxed parallel warps of shrinkable filaments or yarns extended in the machine direction or lapped across the cross direction of the composite sheet may also be used as the shrinkable layer. Such an array of filaments or yarns is preferably capable of causing the bonded composite sheet to shrink by at least 20% in length in at least one direction, calculated based on the original length prior to shrinkage.

When elastic gathered multi-layer composite products are desired, the shrinkable layer is selected to obtain the desired stretch properties in the final composite sheet. Elastic as used herein refers to the extent to which a material recovers to an original dimension, length for example, after a force has been applied along the dimension and then released. For example, when stretch properties are desired in the machine direction with minimum stretch in the cross direction, a warp of parallel spirally-crimpable filaments aligned in the machine direction of the composite sheet, or a directional (MD oriented) carded web comprising spirally-crimpable fibers can be used. When two-directional stretch properties are desired, i.e. in both the machine direction and the cross-direction, more random layers of spirally-crimpable continuous filaments or yarns, such as air-laid webs and substantially nonbonded spunbond webs can be used. Alternately, the shrinkable layer may comprise a tensioned elastic layer such as a tensioned elastic film or warp of elastic filaments, as described above.

The gatherable, less-shrinking or non-shrinking, layer(s) should be capable of buckling between the bonds during the shrinking step. Materials suitable for use as the gatherable layer(s) include nonwoven webs wherein the fibers are not significantly interentangled or interbonded, knit or woven fabrics, and films. In a preferred embodiment, the gatherable layer is a nonwoven web. This layer preferably has a thickness of between about 1.0 and 10.0 mm before shrinking and buckling, increasing to the range of 3 to 20 mm after buckling. The overall thickness of the product, including the one or more gathered/buckled layers is at least about 3 mm, preferably in the range of about 3 mm to 30 mm, more preferably between about 6 mm and 30 mm.

Nonwoven webs suitable for use as the gatherable layer include bonded and unbonded webs. Unbonded webs about 1-10 mm thick are suitable. The gatherable layer may be pre-bonded over part or all of its surface prior to bonding to the shrinkable layer. The layers can be pre-bonded using methods such as thermal or ultrasonic point bonding, or thermal bonding with pattern-printed thermally fusible adhesives, hydraulic needling, mechanical needling, etc.

Composite sheets in which the shrinkable or gatherable layer is a film are useful in end uses such as raincoats, wind jackets, medical devices, etc. Films used in the composite sheets of the current invention may be breathable or non-breathable. Examples of suitable breathable films are films of copolyetheresters such as Hytrel®, available from E.I. du Pont de Nemours and Company, Wilmington, Del. (DuPont). Composite sheets in which the gatherable layer is a knit, woven, or nonwoven fabric or web are suitable for use in apparel and home furnishings in end uses including upholstery, apparel etc.

The individual layers in the multi-layer composite sheets of the current invention may be prepared and combined, bonded, and heat treated in separate process steps. Alternately, the layers can be combined, bonded, and heat treated in-line in a continuous process. When shrinkable nonwoven layers are used, the individual layers forming the multi-layer nonwoven composite may be consolidated, such as by calendering, prior to bonding and heat treatment. The layers are assembled and bonded together using an intermittent pattern of bonds, for example points or lines, prior to shrinking. When the shrinking step is a heat treatment step, pattern bonding may be conducted in-line preceding the heating step or a bonded composite sheet can be collected, such as by winding on a roll, and heat-treated in subsequent processing. In a preferred embodiment, the layers are intermittently bonded using thermal or ultrasonic point bonding. Thermal pattern-bonding involves applying heat and pressure at discrete spots on the surfaces of the multi-layer composite, for example by passing the layered structure through a nip formed by a heated patterned calender roll and a smooth roll, or between two patterned rolls. During thermal point bonding, one or more of the polymeric components in at least one of the layers is partially melted in discrete areas corresponding to raised protuberances on the heated patterned roll to form fusion bonds which hold the individual layers together to form a cohesively bonded multi-layer composite sheet. The bonding roll pattern may be any of those known in the art, and preferably is a pattern of discrete point or line bonds.

In an alternate embodiment, the layers may be pattern-bonded using a liquid binder, for example, latex or a liquefied binder, such as a suspension of low melting thermoplastic powder, which is applied such as by printing in a pattern. When fibrous web layers are used, the liquid binder is preferably applied in such a way as to form bonds that extend through the entire thickness of the web. The liquid binder may be applied through one face after the layers are assembled, or to the inner surface of either or both of the shrinkable and gatherable layer(s). Alternately, when the layers comprise nonwoven webs, low-melt binder fibers or binder particles can be intermittently applied between the layers and the multi-layer composite bonded using smooth heated calendar rollers. Preferably, the binder particles or binder fibers have dimensions of between about 0.2 mm and about 2 mm in at least one direction and are added to the web at levels which provide between 5 and 30 bonds/in$^2$ (0.8 to 4.6 bonds/cm$^2$). The low-melt binder particles typically amount to less than 10% of the product weight.

Other methods of bonding which can be used to bond the layers together prior to heat treatment include chemical bonding, mechanical needling, hydraulic needling or discrete point stitching or line-stitching. A discrete mechanical needling pattern can be achieved using needle plates that can place several needles on the same spot by being synchronized with the web motion. Spaced apart sewing or stitching can be performed using a commercial quilting machine. Similarly, a chemical bond activator or adhesive may be applied intermittently in a pattern on the inner surfaces of the layers before they are contacted with each other.

The bonds are preferably spaced at about 1-4 per inch (0.4 to 2 per centimeter) with approximately 1-16 bonds/in$^2$ (0.2 to 2.5 bonds/cm$^2$). Bond density is kept low to maximize bulk in the final composite sheet after shrinking. Bonds can be round, square, rectangular, triangular or may have other geometric shapes. The percent bonded area can vary between about 5 to 50%. For structures in which spirally-crimpable fibers are used in the shrinkable layer to achieve shrinkage, the distance between adjacent bonds can be adjusted so that the multi-layer composite shrinks by at least about 10% in length in at least one direction as a result of the heating step.

Figure 1B:
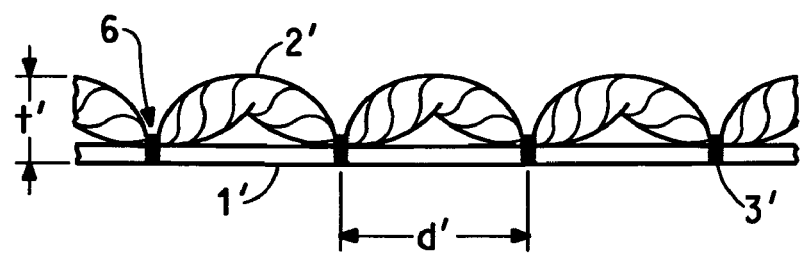
FIG. 1b is a schematic drawing of the product of FIG. 1a after shrinking.

FIG. 1a is a schematic cross-sectional drawing of a two-layer composite sheet prior to shrinking. Shrinkable layer 1 is bonded to gatherable layer 2 with intermittent bonds 3 spaced apart by a distance d of at least 5 mm. FIG. 1b is a schematic drawing of the product of FIG. 1a after causing the shrinkable layer to shrink. The spacing d' between bonds after shrinking is much smaller than spacing d before shrinking and the overall thickness t' of the layer after shrinking is substantially greater than the thickness t of the starting composite of FIG. 1a. The basis weight of the gathered layer 2' is higher by a factor of d/d' and the thickness is much larger by a factor of t'/t.

Figure 2A:
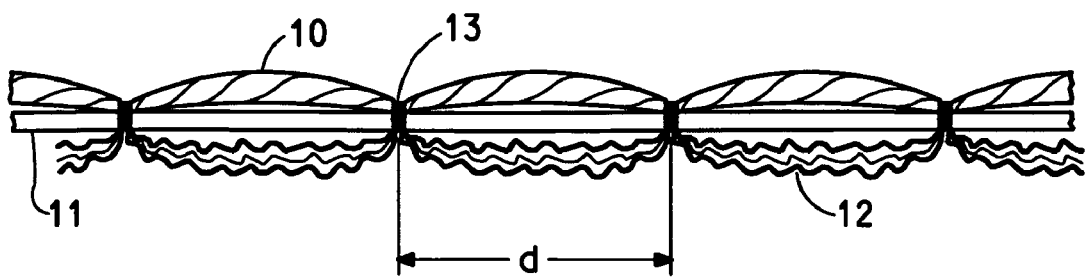
FIG. 2a is a schematic drawing of a three-layer composite sheet comprising one shrinkable layer, and two gatherable fibrous layers intermittently bonded, one on each side, to the shrinkable layer.
Figure 2B:
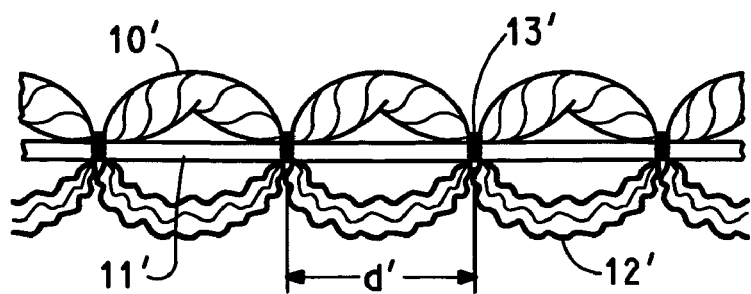
FIG. 2b is a schematic drawing of the three-layer composite sheet of FIG. 2a after the shrinkable layer has been caused to shrink.

FIG. 2a is a schematic drawing of a three-layer composite sheet comprising shrinkable layer 11 and two gatherable fibrous layers 10 and 12, one on each side of the shrinkable layer. The layers are intermittently bonded with bonds 13, with a bond spacing d. FIG. 2b is a schematic drawing of the three-layer composite sheet of FIG. 2a after the shrinkable layer has been caused to shrink. After shrinking, the bond spacing d' is reduced compared to d in FIG. 2a and the thickness and bulk are increased compared to the starting, unshrunk, composite sheet. As shown in FIG. 2b, buckled gatherable layers 10' and 12' have been caused to bulk, increasing the actual thickness of the individual gathered layers in addition to increasing the overall thickness of the composite sheet caused by the gathering of the layers due to the decrease in bond distance to d' after shrinking. By using bulkable gatherable layers, the overall bulk of the final composite sheet is higher than the bulk of the composite sheet would have been if the gatherable layers buckled during shrinking without bulking of the individual layers. Suitable bulkable, gatherable layers include spirally-crimpable layers which crimp during the shrinking step, unbonded staple and filament webs, lightly needled cross-lapped webs, etc.

Figure 3A:
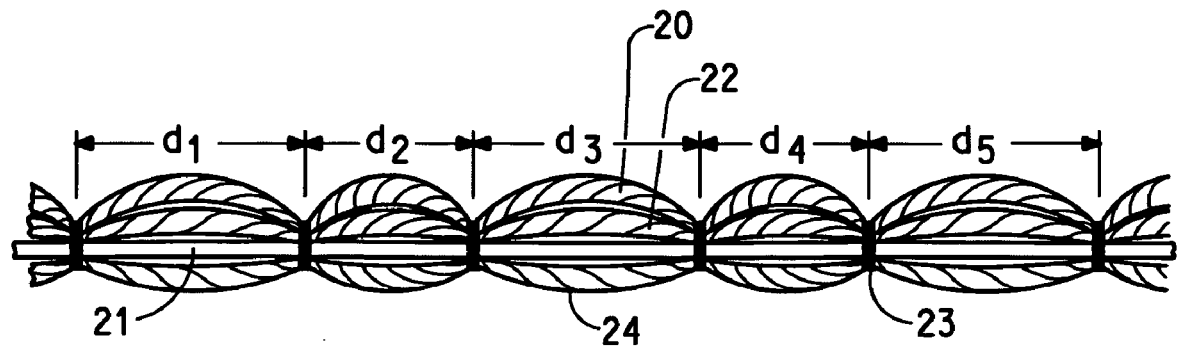
FIG. 3a is a schematic drawing of a four-layer composite sheet comprising a single shrinkable layer having two gatherable fibrous layers intermittently bonded to one face, and a single gatherable fibrous layer intermittently bonded to the other face.
Figure 3B:
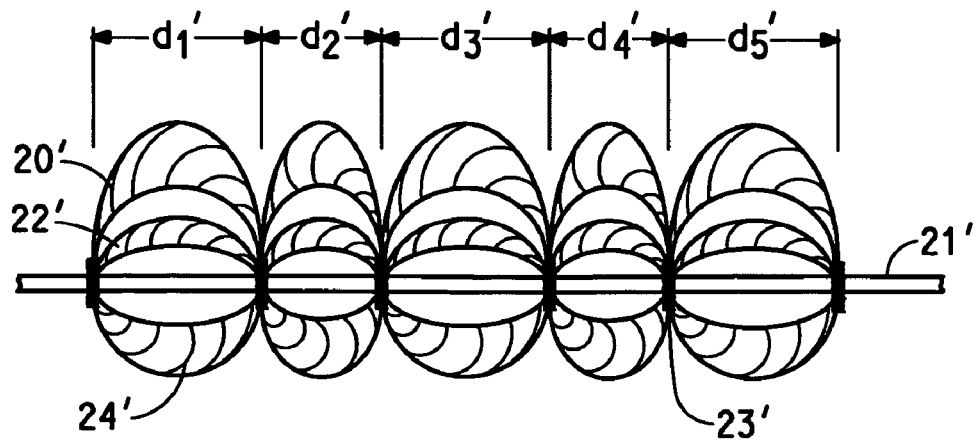
FIG. 3b is a schematic drawing of the four-layer composite sheet of FIG. 3a after the shrinkable layer has been caused to shrink.

FIG. 3a is a schematic drawing of a four-layer composite sheet comprising shrinkable layer 21 having two layered gatherable layers 20 and 22 intermittently bonded to one face and a single gatherable layer 24 intermittently bonded to the opposite face by bonds 23. The spacing between the bonds in the composite sheet is varied as depicted by $d_1$ to $d_5$ to provide desired aesthetics to the surface. It is noted that the spacing d can be similarly varied for the embodiments other than that depicted here in FIG. 3. The bond patterns on the top and bottom surfaces of the composite sheet are substantially identical. FIG. 3b is a schematic drawing of the four-layer composite sheet of FIG. 3a after the shrinkable layer has been caused to shrink, showing the buckling of gathered layers 20', 22', and 24' between bonds 23' and wherein $d_1'$ to $d_5'$ are smaller than $d_1$ to $d_5$, respectively. Relatively dense, but lightweight gatherable layers combined with a bulky or open gatherable web layer can be used to block wind or moisture or simply to add resilience. The outer layer can be used to provide durability and protection for the inner layer(s).

The bonded multi-layer composite can be heat-treated in-line immediately after bonding or the bonded composite fabric can be rolled up and heat treated during later processing (dyeing, finishing, etc.). In a preferred embodiment of the current invention, the bonded multi-layer composite is formed from fibrous layers and is shrunk by heating in a wet-finishing step using hot water or steam, such as during conventional dyeing or finishing processes.

When the multi-layer composite sheet is very light or very surface sensitive, for example when one of the outer layers comprises a substantially non-bonded nonwoven web, the bonded multi-layer composite sheet is preferably heat-treated under conditions which allow the composite nonwoven to shrink evenly under "free-shrinkage conditions". By "free-shrinkage conditions" it is meant that there is virtually no contact between the web and the surfaces that restrict the shrinkage of the multi-layer composite sheet. That is, there are no substantial mechanical forces acting on the multi-layer composite sheet to interfere with or retard the shrinking process. Alternately, any surface that is in contact with the surface of the composite sheet during the heat treatment step is moving at substantially the same surface speed as that of the continuously shrinking multi-layer composite in contact with the surface so as to minimize frictional forces which would otherwise interfere with shrinkage of the shrinkable layer. Such free-shrinkage processing will provide maximum shrinkage of the shrinkable layer.

To achieve the very low density (and the corresponding very high bulk) of this invention, it is desirable to utilize lightweight shrinking layers, preferably layers that weigh 1 oz/yd² (33.9 g/m²) or less. As an example a warp of 155 denier (172 dtex) POY (partially oriented yarn) polyester filament yarns spaced at 25/inch (9.8/cm) starts at approximately 0.5 oz/yd² (17 g/m²), and when heated shrinks to approximately 1.0 oz/yd² (33.9 g/m²). Optionally, such warps can be cold drawn to a weight of 0.20 to 0.25 oz/yd² (6.78 to 8.48 g/m²) before bonding, shrinking to a final weight of 0.5 oz/yd² (17.0 g/m²). Similarly, a warp of 70 denier (77.8 dtex)/34 filament bicomponent filament poly(ethylene terephthalate/poly(trimethylene terephthalate) (2GT/3GT) bicomponent filament yarns, spaced at 20/inch (7.9/cm) would weigh less than 0.2 oz/yd² (6.78 g/m²) and shrink to approximately 0.4 to 0.5 oz/yd² (13.6 to 17.0 g/m²).

Figure 4:
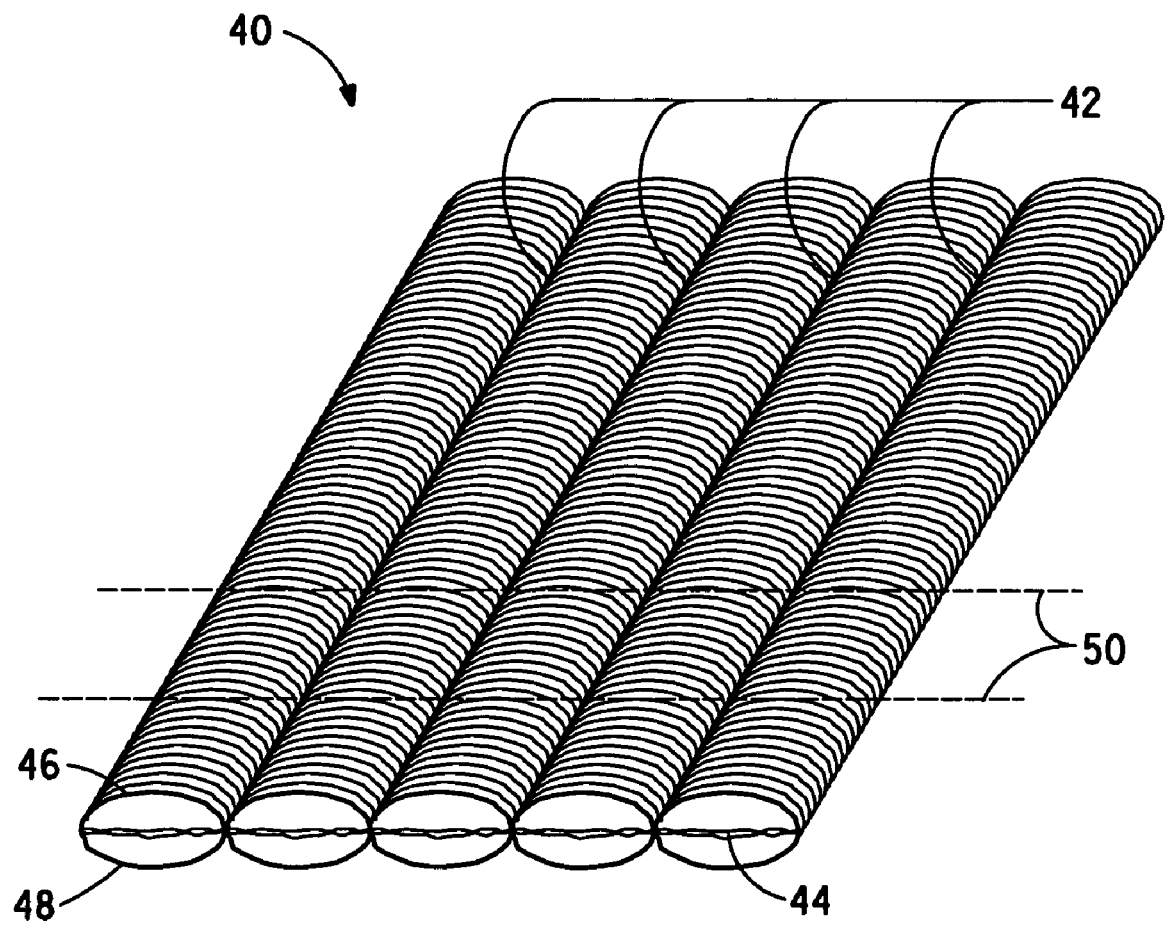
FIG. 4 is a schematic drawing of a composite sheet structure according to the current invention.

FIG. 4 shows a bulky composite nonwoven 40 that has been formed by bonding a shrinkable layer, for example a carded web of multiple-component fibers having latent spiral crimp, to two nonwoven webs using a series of line bonds 42 extending in the cross direction of the composite sheet. This arrangement would allow the shrinkable layer to shrink in the machine direction. After shrinking, the resulting product 40 comprises shrunk layer 44 sandwiched between buckled outer layers 46 and 48. The bonded cellular product can also be cut into small discrete sections (strips, squares, etc.), to be used as durable resilient filler in pillows, cushions, etc. and for use as an insulation layer in garments. For example, composite 40 can be cut along dashed lines 50 substantially perpendicular to the bond lines 42 to form strips of the bulky material, which may be further cut into even smaller articles. Sections having a width of about 1 to 25 mm (distance between cut lines 50) are preferred, with a width of about 5 mm being most preferred. Alternately, composite 40 can be cut along bond lines 42 to form longer tubes of the bulky, resilient composite having a length in the range of about 20 to 250 mm.

Examples of light, bulky and resilient composite structures are illustrated in the Examples below.

Test Methods

The density and bulk of the products of this invention are determined by measuring the thickness (t and t' in FIGS. 1a and 1b above) of the product, without applying pressure. It should be noted that dimension "t" is considered to represent the overall thickness of the product, ignoring the spaces between the gathers such as those shown as 6 in FIG. 1b, which contain no fibers. Response to vertical loading is a function of dimension "t", and is unrelated to spaces 6 in FIG. 1b. The thickness of the composite sheets (t, t') is measured by slicing a thin layer of the product and measuring this thickness without applying substantial pressure to the composite sheet during the measurement. Post-compression thickness is measured by compressing the product using a load of 50 psi (344.8 kPa) for 30 minutes and allowing the sample to recover for 3 minutes prior to measuring the post-compression thickness. The post-compression bulk is preferably at least 50 cc/g.

Bulk is determined using the formula:

$$Bulk = (T) \times (10,000)/(BW)$$

wherein
T=Thickness in (cm)
BW=Sheet basis weight (g/m²)
Density=1/Bulk

Basis weight was measured by cutting a sample to the dimensions 6.75 inch by 6.75 inches (17.1 cm by 17.1 cm) and weighing the sample. The mass of the sample in grams is equal to the basis weight in oz/yd². This number may then be multiplied by 33.91 to convert the units to g/m².

Intrinsic viscosity (IV) was determined for 2GT and 3GT polymers using a Viscotek Forced Flow Viscometer Y900 (Viscotek Corporation, Houston, Tex.) with the polyester dissolved in 50/50 weight % trifluoroacetic acid/methylene chloride at a 0.4 grams/dL concentration at 19° C. following an automated method based on ASTM D 5225-92.

EXAMPLES

Example 1

A 15-gage (6 yarns/cm) warp of 155 denier (172 dtex)/34 filament POY (partially oriented) poly(ethylene terephthalate) (2GT) yarns was sandwiched between two carded nonwoven webs, each web weighing 0.7 oz/yd² (23.7 g/m²). The partially oriented yarn is available from DAK Americas as 155/34 POY polyester. The webs were prepared from 1.5 inch (3.8 cm) long/1.5 dpf (1.7 dtex/filament) T-54 polyester staple (available from DuPont) processed through a J. D. Hollingsworth nonwoven card. The directions of highest orientation (machine direction) in the warp and webs were aligned in the same direction in the layers forming the composite. The three-layer composite was bonded using an ultrasonic hand tool 0.1 inches (0.25 cm) wide, with continuous bonding lines extending in the cross direction spaced 0.75 inches (1.9 cm) apart. The bonded composite weighed approximately 1.8 oz/yd² (61 g/m²). Its visual cross sectional (un-compressed) thickness (see FIG. 1) was approximately 0.4 inches (1 cm), with a density near 0.006 g/cc or a bulk of 164 cc/g. When the product was subjected to a pressure of 50 psi (345 kPa) at room temperature for 30 minutes, its thickness was reduced to 0.15 inches (0.38 cm), corresponding to a bulk of 32 cc/g.

The composite was heated to 150° C. in an oven for 30 seconds. It shrank in the machine direction to a basis weight of 3.8 oz/yd² (128.8 g/m²). Its thickness increased to 0.8 inches (2 cm) and after a 3-minute compression at 50 psi (345 kPa) it recovered to a thickness of 0.35 inches (0.89 cm). These two thicknesses correspond to a bulk of 247 cc/g before compression, and 108 cc/g after compression.

Example 2

A composite sheet was prepared using the method described in Example 1 except the shrinkable layer was a warp of taut 150 denier (16.7 tex) 2GT/3GT continuous filament yarn instead of the 2GT POY warp. The 2GT/3GT filaments were spun in a side-by-side configuration by conventional melt spinning of polyethylene terepthalate (2GT) having an intrinsic viscosity of 0.52 dl/g and polytrimethylene terepthalate (3GT) having an inherent viscosity of 1.00 dl/g through round 68 hole spinnerets with a spin block temperature of 255° C.-265° C. The polymer volume ratio in the fiber was controlled to 60/40 2GT/3GT by adjustment of the polymer throughput during melt spinning. The filaments were withdrawn from the spinneret at 450-550 m/min and quenched via conventional cross-flow air. The quenched filament bundle was then drawn to 4.4 times its spun length to form yarn of continuous filaments having a denier per filament of 2.2 (2.4 dtex), which were annealed at 170° C., and wound up at 2100-2400 m/min. The initial unshrunk taut composite had essentially identical basis weight and bulk as the initial unshrunk composite sheet of Example 1. After release of tension followed by heating at 150° C. for 30 seconds, the composite sheet shrank in the machine direction to a basis weight of 3.6 oz/yd² (122 g/m²) and to a thickness of 0.75 inches (1.9 cm) with a post-compression thickness of 0.35 inches (0.89 cm), corresponding to a bulk of 247 cc/g before compression and a bulk of 114 cc/g after compression. The product was elastically stretchable in the machine direction. A sample 6 inches (15.2 cm) long and 2 inches (5.08 cm) wide was pulled in the machine direction by 40%, held for 30 seconds, released for 30 more seconds and allowed to recover. The sample recovered to substantially its original length.

Example 3

A composite sheet was prepared using the method described in Example 1 except that a layer of pre-bonded spunbonded nonwoven, Style 2250 Reemay® polyester spunbond (from BBA Corporation of Old Hickory, Tenn.) was added as the outermost layers, one on each side, prior to bonding, resulting in a 5-layer composite weighing 2.8 oz/yd² (94.9 g/m²) as formed and 5.2 oz/yd² (176.3 g/m²) after shrinking. The thickness after shrinking was 0.85 inches (2.2 cm) and the post-compression thickness was 0.60 inches (1.52 cm), corresponding to bulk levels of 122 cc/g and 86 cc/g, respectively.

Example 4

A composite sheet was prepared using the method described in Example 2 with two additional sheets of the same Reemay® Style 2250 bonded with the original 3-layer structure, one layer of Reemay® nonwoven on each side. The final result was an elastic structure weighing 4.8 oz/yd² with a bulk of 115 cc/g and a post-compression bulk of 78 cc/g.

Example 5

A composite sheet was prepared using the method described in Example 4 with the exception that the bond pattern was changed to diagonal lines, 1 inch (2.54 cm) apart at 45° to the warp. The final shrunk product had a basis weight of 4.4 oz/yd², a thickness of approximately 0.8 inches (2.0 cm), and a post-compression thickness of 0.4 inches (1.0 cm) (bulk of 133 cc/g and 63 cc/g, respectively).

The basic concept and examples explained above should not limit the scope of this invention. One or more gatherable layers can be bonded to one or both sides of the shrinkable layer. The bonding pattern can be varied from lines to points, dots, shaped bonded areas and any other variations that allow a spacing of 5 mm or more between adjacent bonds in one or more directions. Shrinkage can be in one or more directions. The gatherable layer can be a continuous filament warp of yarn attached to a shrinkable fabric, nonwoven, or film, etc. Fibers can be varied in the gatherable layers, blended, layered, etc. The buckled loops formed by the gatherable layer after shrinkage of the shrinkable layer can vary in size and height by varying the bond distance, as shown in FIGS. 3a and 3b. One of the advantages of this invention is that the outer gatherable layers can be low-density webs (card webs, airlaid webs, bulked warps, etc.) that can first be buckled and bulked, then post-bonded in the buckled/bulked state, in situ, for maximum resilience and bulk. This can be achieved by using gatherable webs comprising "sheath binder/high-melt core" fibers, powder binders applied before or after shrinkage, or liquified binders applied after shrinking.

What is claimed is:

1. A multi-layer composite sheet comprising:
  a first polymeric layer;
  a second polymeric layer bonded to a first side of the first layer with an intermittent pattern of bonds, the bonds being separated by a bond distance of between about 5 and 25 mm in at least one direction, and the second layer being gathered between the bonds;
  the multilayer composite sheet having a thickness between about 3 mm and 30 mm and a bulk of at least 50 cc/g;
  wherein the first polymeric layer comprises spirally crimped fibers and wherein the spirally crimped fibers comprise a first component and a second component arranged in a configuration selected from the group consisting of side-by-side and eccentric sheath-core.

2. The composite sheet according to claim 1 wherein the composite sheet has a thickness of between about 6 mm and 30 mm.

3. The composite sheet according to claim 2 wherein the composite sheet has a bulk of at least 100 cc/g.

4. The composite sheet according to claim 1 wherein the first component comprises poly(ethylene terephthalate) and the second component comprises poly(trimethylene terephthalate), the two components being arranged in a side-by-side configuration.

5. The composite sheet according to claim 1 wherein the first polymeric layer consists essentially of spirally crimped fibers.

6. The composite sheet according to claim 1 wherein the first polymeric layer comprises a fibrous layer of partially oriented yarns.

7. The composite sheet according to claim 1 wherein the second polymeric layer is selected from the group consisting of films and nonwoven webs.

8. The composite sheet according to claim 1 wherein the first and second polymeric layers are nonwoven webs.

9. The composite sheet according to claim 8 wherein the first polymeric layer is a web of spirally crimped fibers.

10. The composite sheet according to claim 1 wherein the bond distance is varied across the sheet.

11. The composite sheet according to claim 1 further comprising a third polymeric layer bonded to a second side of the first polymeric layer opposite the first side, the third polymeric layer being gathered between the bonds.

12. The composite sheet according to claim 1 wherein the first, second, and third polymeric layers are independently selected from the group consisting of nonwoven webs and polymeric films.

13. The composite sheet according to claim 12 wherein each of the first, second, and third layers comprise nonwoven webs.

14. The composite sheet according to claim 12 further comprising a fourth polymeric layer selected from the group consisting of nonwoven webs and polymeric films attached to the first side of the first nonwoven layer and placed intermediate said first polymeric layer and said second polymeric layer.

15. A cushioning material comprising the multi-layer composite of claim 1.

16. A garment comprising a layer of the multi-layer composite of claim 1.

17. The cushioning material of claim 15, wherein the first polymeric layer comprises a multiple-component nonwoven web comprising spirally crimped fibers and further comprising a third polymeric layer bonded to a second side of the first layer with an intermittent pattern of line bonds extending in the cross direction of the composite sheet, the bonds being separated by a bond distance of between about 5 and 25 mm, and the third layer being gathered between the bonds.

18. The cushioning material of claim 17, wherein it is a discrete section having a substantially tube shape with a length of about 20 to 250 millimeters in the direction of the bond lines.

19. The cushioning material of claim 17, wherein it is a discrete section having a substantially tube shape with a length of about 5 millimeters in the direction of the bond lines.

20. The cushioning material of claim 17, wherein it is a discrete section having a width of about 1 to 25 millimeters substantially perpendicular to the bond lines.

* * * * *